(12) United States Patent
Schmitt et al.

(10) Patent No.: US 6,525,478 B2
(45) Date of Patent: Feb. 25, 2003

(54) DEVICE FOR CHECKING THE EVALUATION CIRCUIT FOR AUTOMATIC SWITCHING OPERATIONS OF ILLUMINATION DEVICE IN VEHICLES

(75) Inventors: Patrick Schmitt, Lichtenau (DE); Norbert Hog, Buehl (DE); Bruno Hodapp, Achern-Oensbach (DE); Rainer Pientka, Renchen (DE); Hans Meier, Ottersweier (DE); Henry Blitzke, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 09/808,753

(22) Filed: Mar. 15, 2001

(65) Prior Publication Data

US 2001/0033491 A1 Oct. 25, 2001

(51) Int. Cl.7 .............................................. H05B 37/02
(52) U.S. Cl. .................... 315/82; 315/155; 307/10.8; 307/117
(58) Field of Search .............................. 315/82, 83, 77, 315/155, 156, 159; 307/10.8, 10.1, 116, 117

(56) References Cited

U.S. PATENT DOCUMENTS 5,231,373 A * 7/1993 Freeman et al. ............ 307/10.8
5,998,929 A * 12/1999 Bechtel et al. ............. 307/10.8
6,302,545 B1 * 10/2001 Schofield et al. ........... 315/82
6,379,013 B1 * 4/2002 Bechtel et al. ............... 359/601

FOREIGN PATENT DOCUMENTS

DE         195 23 262          1/1997

* cited by examiner

Primary Examiner—Don Wong
Assistant Examiner—Thuy Vinh Tran
(74) Attorney, Agent, or Firm—Kenyon & Kenyon

(57) ABSTRACT

A device for checking the evaluation circuit for automatic switching operations of the illumination devices in vehicles. A sensor device contains a global sensor for detecting the light conditions in the environment of the vehicle and a directional sensor for the directed detection of the light conditions in the direction of travel in front of the vehicle. The signals of the sensor device are supplied to the evaluation circuit, to determine whether a change in the switching state of the illumination devices is necessary. In order to check the evaluation circuit which is designed using analog technology, in the operating state, the voltage supply to the sensor unit is briefly interrupted at predetermined intervals, as a result of which the condition "night" is simulated. When the evaluation circuit is functioning correctly, this is detected by it as such. When the evaluation circuit is not functioning correctly, a signal is generated, directing attention to the faulty functioning and causing further steps to be initiated. In an embodiment, the checking operation and the voltage interruption are carried out by a microcontroller. In a second checking operation, it is established, in particular in the software, whether the emitted signal values of the evaluation circuit do not exceed a lower value that is determined by the hardware. In a third checking operation, the correct functioning of the A/D converter unit is ascertained.

10 Claims, 1 Drawing Sheet

DEVICE FOR CHECKING THE EVALUATION CIRCUIT FOR AUTOMATIC SWITCHING OPERATIONS OF ILLUMINATION DEVICE IN VEHICLES

FIELD OF THE INVENTION

The present invention relates to a device for checking the evaluation circuit for automatic switching operations of illumination devices in vehicles.

BACKGROUND INFORMATION

From German Published Patent Application No. 195 23 262 A1, a device according to the species for the automatic switching of illumination devices in vehicles is known. In this context, a sensor device is provided which contains a global sensor for detecting the light conditions in the environment of the vehicle and a directional sensor for the directed detection of the light conditions in the direction of travel in front of the vehicle. The signals of the sensor device are supplied to an evaluation circuit to determine whether a change in the switching state of the illumination devices is necessary. In this known evaluation circuit, executed using analog technology, no monitoring of correct functioning is available.

The task of the present invention is to monitor the analog evaluation circuit for the automatic light switching.

SUMMARY OF THE INVENTION

The device according to the present invention for checking the evaluation circuit for automatic switching operations of illumination devices in vehicles advantageously establishes whether the evaluation device is functioning correctly. In this manner, the following defect is eliminated: in the event the analog evaluation circuit for the automatic switching operation for the illumination device of the vehicle breaks down, i.e., the analog evaluation circuit does not detect the safety-critical condition "twilight" or "night," the low beam might not be switched on, for example, by a control unit for the low beam. The present invention therefore monitors this safety-critical evaluation circuit and, in the event of its not functioning, initiates further measures.

In this way, the control unit for the low beam can be informed that the evaluation circuit is defective. To remove this defect, the illumination device can be activated by this low-beam control unit and, in addition, an information message can be directed to the driver of the vehicle regarding the problem.

According to the present invention, the voltage supply for the sensor unit is interrupted for short durations at predetermined intervals for checking the evaluation circuit, which operates in analog technology, as a result of which the condition "night" is simulated, and, when the evaluation circuit is operating correctly, this is detected by the latter as such, whereas, when the evaluation circuit is not functioning correctly, a signal is generated, directing attention to the defective functioning and setting in motion further steps.

According to one embodiment of the device according to the present invention, a microcontroller is provided, which, for checking purposes, causes the short-duration interruption of the voltage supply to the sensor device at predetermined intervals via a predetermined output. The output signal of the analog evaluation circuit is supplied to the microcontroller at a predetermined input as the input signal, and the microcontroller emits a signal at an output for bringing about further steps.

In accordance with another embodiment of the device according to the present invention, the output signal of the microcontroller, generated when the evaluation circuit is not functioning correctly, is supplied to a control unit for the low beam, the evaluation circuit initiating the further steps. Further steps of this type can be, for example, the automatic switching on of the low beam as well as the supplying of information to the driver of the vehicle regarding the abnormal functioning of the analog evaluation circuit.

In accordance with yet another embodiment of the device according to the present invention, the microcontroller reads in the output signal of the evaluation device via an analog/digital input, a predetermined number of increments corresponding to a predetermined voltage, for example, 255 increments corresponding to 5 V, and when the output signal of the evaluation device lies above a predetermined limit value, the device is functioning correctly, i.e., in response to the intentionally carried out voltage interruption, the simulated condition "night" is detected, and, if this is not the case, the signal for initiating further steps is generated by the microcontroller.

In addition, according to another embodiment of the present invention, a second checking can be undertaken which particularly detects defects arising due to shunting with respect to the supply voltage or the ground. For this purpose, the analog/digital values detected by the microcontroller, supplied by the evaluation circuit, are checked as to whether they lie above a lower threshold value. This checking is carried out in a very advantageous manner, the lower limit value being one that is determined by the hardware.

In a further embodiment of this additional checking operation, for example, in response to a shunt with respect to the supply voltage or ground, when the checked lower limit value is not exceeded by the microcontroller, a signal is generated, which indicates the faulty functioning of the evaluation circuit and which, if appropriate, is used by the low-beam control unit for bringing about further steps.

According to a further embodiment of the present invention, a third checking operation can be carried out, which aids in checking the analog/digital converter unit, which converts the analog values delivered by the evaluation circuit into digital values. For this purpose, it is provided that the analog/digital converter unit, which converts analog values supplied by the evaluation circuit into digital values, is checked with respect to its performance reliability, and that, when it is not functioning correctly, the microcontroller at its output generates a signal for bringing about further steps.

According to an implementation of this third checking operation, it is provided that when the analog/digital converter unit of the microcontroller is used, the converter unit is checked by the cyclical supply of a voltage familiar to the microcontroller, the voltage being selected preferably in the middle range between the upper and lower reference voltage. Preferably, for taking account of the tolerances of the individual components for the checking operation in the middle range, an upper and a lower threshold value are established.

DETAILED DESCRIPTION

Figure 1:
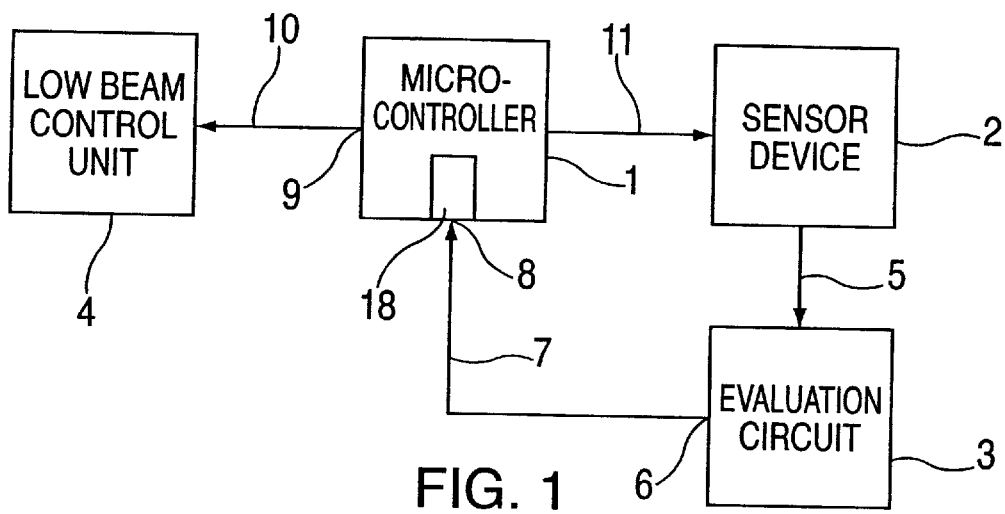
FIG. 1 shows a block diagram that schematically depicts the design of the device configured according to the present invention for checking the evaluation circuit for automatic switching operations of the illumination devices in vehicles.

In the schematic block diagram of FIG. 1, a microcontroller 1, a sensor device 2, an evaluation circuit 3.operating in analog technology, as well as a low-beam control unit 4 are depicted. The sensor service 2 contains a global sensor for detecting the light conditions in the environment of the vehicle and a directional sensor for the directed detection of the light conditions in the direction of travel in front of the vehicle. These two sensors are not depicted in detail. The signals determined by them are supplied via a line 5 to evaluation circuit 3, operating in analog technology. Evaluation circuit 3 at its output 6 makes available analog or digital output values, which are supplied via a line 7 to an input 8 of microcontroller 1. These values are designated below as analog/digital values A/D and are explained in greater detail below in the diagrams of FIGS. 2 and 3 in different connections.

In the event that microcontroller 1, on the basis of analog/digital values A/D made available at input 8, establishes that the functioning of evaluation circuit 3 is not correct, a signal to this effect is generated by it. This signal is supplied at an output 9 of microcontroller I via line 10 to low-beam control unit 4, as a result of which the control unit is informed as to the faulty functioning of evaluation circuit 3. In this way, it is made possible for low-beam control unit 4 to bring about further steps. These further steps can be, for example, automatically switching on the low beam if it has not already been switched on. In addition, the driver can be informed as to the faulty functioning of analog evaluation circuit 3. In this way, the driver may arrange for a check-up at an appropriate workshop.

The mode of functioning of the device according to the present invention for checking evaluation circuit 3 is described below. During operation, i.e., in the operating state, sensor unit 2 is supplied with voltage, via a line 11, from microcontroller 1. For checking purposes, in the switched-on state, this voltage supply on line 11 is switched off at predetermined intervals, preferably cyclically, by microcontroller 1. In a different method of operation, the computer port in the microcontroller can also be defined as an output. In this manner, the condition "night" is simulated. According to one specific exemplary embodiment, the condition "night" is equated with the voltage of 0 V at the measuring input of an operational amplifier, or it is equated with 5 V at the input of an analog/digital converter unit of microcontroller 1. These inputs are not depicted in detail.

During correct functioning, i.e., if analog evaluation circuit 3 is in order, microcontroller 1, on the basis of analog/digital values AND emitted at output 6 via line 7 to input 8, detects this "night" condition. Via line 10, low-beam control unit 4 is furnished with the information from output 9 of microcontroller 1 that evaluation circuit 3 is functioning normally. At input 8, microcontroller 1 reads in the measured signal from line 7 via an analog/digital input available there. In this context,255 increments can correspond to 5 V.

Figure 2:
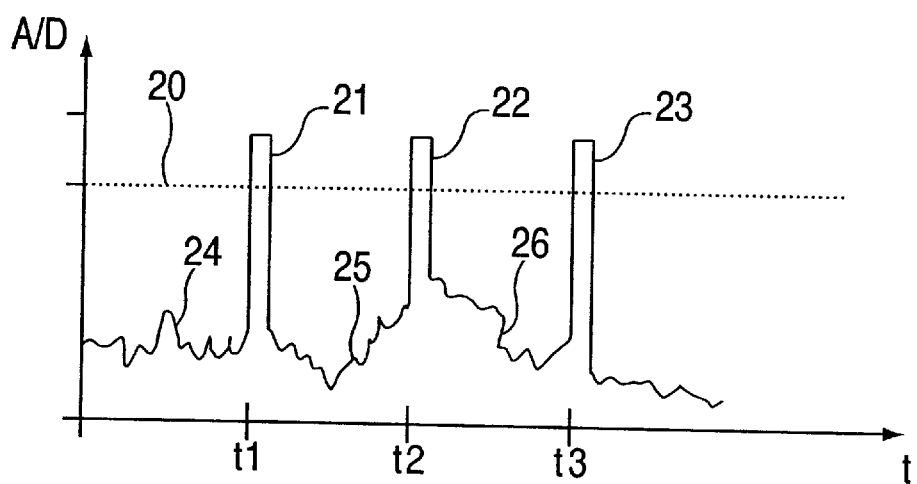
FIG. 2 depicts a graph having the analog/digital values as a function of time in the interruption of the power supply to the sensor unit, taking place according to the invention at predetermined intervals.
Figure 3:
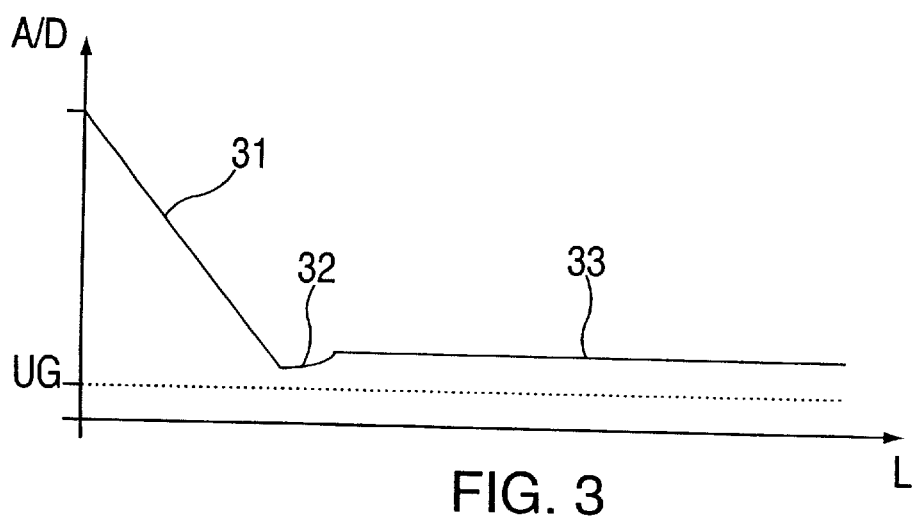
FIG. 3 depicts a graph for checking a lower limit value, the analog/digital values being plotted over light intensity L measured in lux.

If this read-in A/D measured value lies above a predetermined limit, which in the representation in FIG. 2 is designated as 20 and which can be termed the "night" limit, then evaluation circuit 3 is functioning correctly. The condition "night" is therefore detected. In the representation of FIG. 2, rectangular peaks 21, 22, 23 extending beyond limit 20, correspond in cyclical sequence to those values which are attained by microcontroller 1 at time t1, t2, and t3 at predetermined intervals in response to an appropriate voltage interruption. Peaks 21, 22, 23, in this context, extend beyond other curves 24, 25, 26 of diagram FIG. 2. On the other hand, if analog evaluation circuit 3 is not functioning correctly, then limit value 20 is not exceeded by peaks 21, 22, or 23. On the basis of this fact, at output 6 of evaluation circuit 3, a correspondingly low value appears which is read in as such via line 7 and input 8 into microcontroller 1. The latter detects this state and communicates the abnormal functioning state to low-beam control unit 4 via line 10. The control unit can initiate the already mentioned further steps.

According to another embodiment of the device configured according to the present invention for checking the evaluation circuit, a second plausibility check is provided. For this purpose, in FIG. 3, the curve of the analog/digital values, supplied by the evaluation circuit 3, is plotted against light intensity L, which is measured in lux. The diagram shows that, from a maximum value which can correspond to the value of roughly 255 increments or 5 volts in microcontroller 1, the analog/digital value A/D falls in one branch 31 to a lower value, in order then to rise slowly in an arc 32 to a value, designated as 33, which remains constant. Beneath this arcing part 32 and constant part 33, a lower limit value UG is indicated in a dotted line, which is taken into account in the second plausibility check, or in a second type of checking. Lower limit UG is set by the hardware, and the checking in the second checking operation ascertains whether curve parts 31, 32, and 33 lie above this lower limit UG. For a variety of reasons, for example, as a result of a shunt with respect to the voltage supply or the ground, it is possible that lower limit UG is not exceeded, i.e., the values A/D supplied by evaluation circuit 3 are smaller than that stipulated by lower limit UG. This is advantageously detected by microcontroller 1 in the software. In the event the limit is not exceeded, low-beam control unit 4 is similarly provided with the information, because evaluation circuit 3 is not in order in this case as well.

In a further embodiment of the present invention, a third checking operation is provided which aids in the correct functioning of the analog/digital converter unit, which converts the analog signals generated by analog evaluation circuit 3 into digital signals. For this purpose, it is provided that the analog/digital converter unit, which converts the analog values supplied by the evaluation circuit into digital values, is checked with respect to its performance reliability. In the event it is not functioning correctly, microcontroller 1 at its output 9 generates a corresponding signal for initiating further steps.

According to an implementation of this third checking operation, it is provided that when the analog/digital converter of microcontroller 1 itself is used, the microcontroller being depicted in FIG. 1 as 18, it is checked through the cyclical supplying of a voltage familiar to microcontroller 1, which preferably is selected in the middle range between the upper and lower reference voltage. The lower reference voltage is, for example, 0 V and the upper 5 V. The digital value assigned to the middle range can be calculated. As a middle range, for example, 3 V can be selected, corresponding to 153 increments. Therefore, for example, the voltage of 3 V is cyclically supplied to analog/digital converter unit 18 for checking purposes. If 153 increments is not reached, the A/D converter unit is faulty. Preferably, for taking into account the tolerances of the individual components of the hardware for the checking operation, an upper and a lower threshold value are established in the middle range, for example 180 and 110 increments. If, in this third checking operation, which is advantageously integrated into the software of microcontroller 1, a defect is detected, it is also communicated at output 9 to low-beam control unit 4 via line 10 as an error message of evaluation circuit 3, in order to bring about further steps.

Therefore, on the basis of the present invention, three checking circumstances are to be detected in a simple manner in order to establish whether evaluation circuit 3, operating in analog technology, is capable of functioning or not. As a result, it is established that, as a result of the three possible plausibility checks, safety-critical errors are detected. Consequences that could arise from these errors are removed in turn and corresponding communications to the driver of the vehicle are possible.

What is claimed is:

1. A device for checking an evaluation circuit for automatic switching operations of illumination devices in vehicles, comprising:
    an evaluation circuit designed using analog technology; and
    a sensor unit including a global sensor for detecting light conditions in the environment of the vehicle and a directional sensor for the directed detection of the light conditions in the direction of travel in front of the vehicle, the sensor unit outputting signals to the evaluation circuit in order to establish whether a change in the switching state of the illumination devices is required;
    wherein, in an operating state, a voltage supplied to the sensor unit is briefly interrupted at predetermined intervals, as a result of which a "night" condition is simulated, the voltage supply interruptions being detected by the evaluation circuit when the evaluation circuit is functioning correctly, wherein, when the evaluation circuit is not functioning correctly, a signal is generated directing attention to the faulty functioning and causing further steps to be initiated.

2. The device as recited in claim 1, further comprising:
    a microcontroller which, for checking purposes, causes the brief interruption of the voltage supply to the sensor device at the predetermined intervals via a predetermined output and to which an output signal of the analog evaluation circuit is supplied at a predetermined input as an input signal;
    wherein the microcontroller generates an output signal for causing further steps at a further output.

3. The device as recited in claim 2, wherein the microcontroller includes an analog/digital input via which the microcontroller reads in the output signal of the evaluation circuit, a predetermined mumber of increments read in corresponding to a predetermined voltage, the simulated "night" condition being detected when the output signal of the evaluation circuit lies above a predetermined value, the signal for causing further steps being generated if the "night" condition is not detected.

4. The device as recited in claim 2, further comprising:
    an analog/digital converter unit which converts analog values supplied by the evaluation circuit into digital values;
    wherein the analog/digital converter is checked with respect to performance reliability, and that, when it is not functioning correctly, the microcontroller emits a signal for causing further steps at a further output.

5. The device as recited in claim 4, wherein when the analog/digital converter unit of the microcontroller is used, it is checked through a cyclical supplying of a voltage associated with the microcontroller, which is selected in a middle range between an upper and a lower reference voltage.

6. The device as recited in claim 5, wherein, in the middle range, an upper and a lower threshold value is provided for the checking operation.

7. The device as recited in claim 2, further comprising:
    a low-beam control unit, the low-beam control unit being supplied with the output signal generated by the microcontroller when the evaluation circuit is not functioning correctly, the low-beam control unit initiating the further steps.

8. The device as recited in claim 7, wherein analog/digital values detected by the microcontroller that are supplied by the evaluation circuit are checked as to whether they lie above a lower limit value.

9. The device as recited in claim 8 wherein the checking is configurable in accordance with software, and the lower limit value is determined by hardware.

10. The device as recited in claim 8, wherein when the lower limit value checked is not exceeded, the microcontroller generates a signal indicating faulty functioning of the evaluation circuit, the signal being used by the low-beam control unit for initiating further steps.

* * * * *